(12) United States Patent
Miller et al.

(10) Patent No.: US 12,393,396 B2
(45) Date of Patent: Aug. 19, 2025

(54) DEVICE WITH SPEAKER AND IMAGE SENSOR

(71) Applicant: Apple Inc., Cupertino, CA (US)

(72) Inventors: Brett D. Miller, San Carlos, CA (US); Daniel K. Boothe, San Francisco, CA (US); Martin E. Johnson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/211,515

(22) Filed: Jun. 19, 2023

(65) Prior Publication Data

US 2023/0409278 A1    Dec. 21, 2023

Related U.S. Application Data

(60) Provisional application No. 63/354,018, filed on Jun. 21, 2022.

(51) Int. Cl.
*G06F 3/16*      (2006.01)
*H04N 7/18*      (2006.01)

(52) U.S. Cl.
CPC .............. *G06F 3/165* (2013.01); *H04N 7/183* (2013.01)

(58) Field of Classification Search
CPC ................................ G06F 3/165; H04N 7/183
See application file for complete search history.

(56) References Cited

U.S. PATENT DOCUMENTS

| | | | |
|---|---|---|---|
| 7,684,982 B2 | 3/2010 | Taneda | |
| 8,635,066 B2 | 1/2014 | Morrison | |
| 9,253,375 B2 | 2/2016 | Milanfar et al. | |
| 9,317,124 B2 | 4/2016 | Kongqiao et al. | |
| 9,552,676 B2 | 1/2017 | Wong et al. | |
| 9,987,489 B2 * | 6/2018 | Goodall | A61H 23/02 |
| 10,376,153 B2 | 8/2019 | Tzvieli et al. | |
| 10,405,081 B2 | 9/2019 | Hviid et al. | |
| 10,511,910 B2 | 12/2019 | Ma et al. | |
| 10,567,904 B2 | 2/2020 | Sahay | |
| 10,643,637 B2 | 5/2020 | Boulanger et al. | |
| 10,896,591 B2 | 1/2021 | Alameh et al. | |
| 11,003,899 B2 | 5/2021 | Nduka et al. | |

(Continued)

FOREIGN PATENT DOCUMENTS

WO     2016048013 A1     3/2016

OTHER PUBLICATIONS

Tuochao Chen et al., "C-Face: Continuously Reconstructing Facial Expressions by Deep Learning Contours of the Face with Ear-mounted Miniature Cameras," Proceedings of the 33rd Annual ACM Symposium on User Interface Software and Technology. 2020, pp. 1-14.

*Primary Examiner* — Mishawn N. Hunter
(74) *Attorney, Agent, or Firm* — Fernando & Partners, LLP

(57) ABSTRACT

In one implementation, a method of playing audio data is performed at a device including a frame configured for insertion into an outer ear, a speaker coupled to the frame, an image sensor coupled to the frame, one or more processors, and non-transitory memory. The method includes capturing, using the image sensor, one or more images of a physical environment. The method includes generating audio data based on the one or more images of the physical environment. The method includes playing, via the speaker, the audio data.

18 Claims, 4 Drawing Sheets

(56) References Cited

U.S. PATENT DOCUMENTS

| | | |
|---|---|---|
| 11,079,999 B2 | 8/2021 | Chen |
| 11,085,613 B2 | 8/2021 | Moghal et al. |
| 2005/0192050 A1 | 9/2005 | Son et al. |
| 2005/0228673 A1 | 10/2005 | Nefian et al. |
| 2007/0287410 A1 | 12/2007 | Bae et al. |
| 2014/0152557 A1 | 6/2014 | Yamamoto et al. |
| 2018/0341329 A1 | 11/2018 | San Agustin Lopez |
| 2019/0218407 A1 | 7/2019 | Borras et al. |
| 2019/0243598 A1 | 8/2019 | Kim et al. |
| 2019/0391666 A1 | 12/2019 | Kim |
| 2020/0258619 A1 | 8/2020 | Ogawa |
| 2021/0035342 A1 | 2/2021 | Glaser et al. |
| 2021/0110560 A1 | 4/2021 | Knorr et al. |
| 2021/0232232 A1 | 7/2021 | Wang et al. |
| 2021/0259557 A1 | 8/2021 | Frank et al. |
| 2021/0281886 A1 | 9/2021 | Kota et al. |
| 2021/0399911 A1* | 12/2021 | Jorasch ............... H04L 12/1822 |
| 2022/0121288 A1* | 4/2022 | Wu ....................... G06F 3/0346 |

\* cited by examiner

400

At a device including a frame configured for insertion into an outer ear, a speaker coupled to frame, an image sensor coupled to the frame, one or more processors, and non-transitory memory:

Capturing, using the image sensor, one or more images of a physical environment ⎯410

Generating audio data based on the one or more images of the physical environment ⎯420

Playing, via the speaker, the audio data ⎯430

Figure 4

DEVICE WITH SPEAKER AND IMAGE SENSOR

CROSS-REFERENCE TO RELATED APPLICATIONS

This application claims priority to U.S. Provisional Patent No. 63/354,018, filed on Jun. 21, 2022, which is hereby incorporated by reference in its entirety.

TECHNICAL FIELD

The present disclosure generally relates to devices including one or more speakers and one or more image sensors.

BACKGROUND

Various ear-mounted devices, such as earphones or earbuds, include a speaker which outputs sound to a user. Various head-mounted devices, such as headphones or extended reality (XR) headsets, may similarly include a speaker.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart representation of a method of playing audio data in accordance with some implementations.

Figure 1:
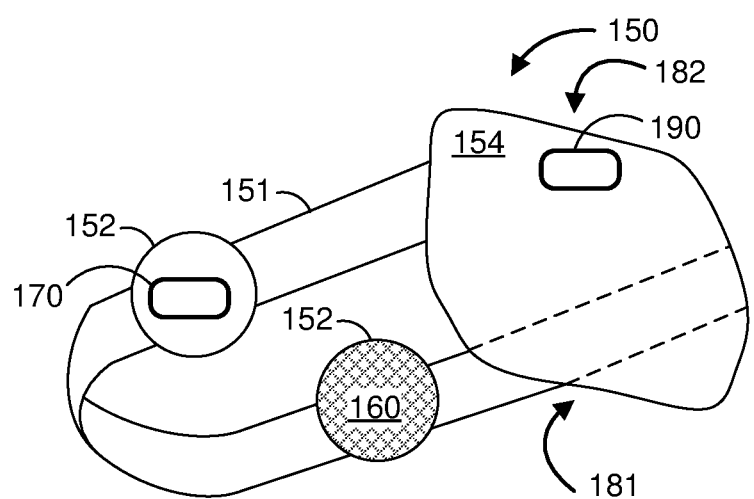
FIG. 1 is a perspective view of a head-mounted device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for playing audio data. In various implementations, the method is performed by a device including a frame configured for insertion into an outer ear, a speaker coupled to the frame, an image sensor coupled to the frame, one or more processors, and non-transitory memory. The method includes capturing, using the image sensor, one or more images of a physical environment. The method includes generating audio data based on the one or more images of the physical environment. The method includes playing, via the speaker, the audio data.

In accordance with some implementations, a device includes a frame configured for insertion into an outer ear. The device includes one or more processors coupled to the frame. The device includes a speaker coupled to the frame and configured to output sound based on audio data received from the one or more processors. The device includes an image sensor coupled to the frame and configured to provide one or more images of the physical environment to the one or more processors. The one or more processors are configured to generate the audio data based on the one or more images of the physical environment.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Various ear-mounted devices, such as earphones or earbuds, include a speaker which outputs sound to a user. Various head-mounted devices, such as headphones or extended reality (XR) headsets, may similarly include a speaker. By including an image sensor on such devices to capture images of a physical environment and outputting audio based on the captured images, various user experiences can be enabled.

FIG. 1 illustrates a perspective view of a head-mounted device 150 in accordance with some implementations. The head-mounted device 150 includes a frame 151 including two earpieces 152 each configured to abut a respective outer ear of a user. The frame 151 further includes a front component 154 configured to reside in front of a field-of-view of the user. Each earpiece 152 includes an inward-facing speaker 160 (e.g., inward-facing, outward-facing, downward-facing, or the like) and an outward-facing imaging system 170. Further, the front component 154 includes a display 181 to display images to the user, an eye tracker 182 (which may include one or more rearward-facing image sensors configured to capture images of at least one eye of the user) to determine a gaze direction or point-of-regard of the user, and a scene tracker 190 (which may include one or more forward-facing image sensors configured to capture images of the physical environment) which may supplement the imaging systems 170 of the earpieces 152.

In various implementations, the head-mounted device 150 lacks the front component 154. Thus, in various implementations, the head-mounted device is embodied as a headphone device including a frame 151 with two earpieces 152 each configured to surround a respective outer ear of a user and a headband coupling the earpieces 152 and configured to rest on the top of the head of the user. In various implementations, each earpiece 152 includes an inward-facing speaker 160 and an outward-facing imaging system 170.

In various implementations, the headphone device lacks a headband. Thus, in various implementations, the head-mounted device 150 (or the earpieces 152 thereof) is embodied as one or more earbuds or earphones. For example, an earbud includes a frame configured for insertion into an outer ear. In particular, in various implementations, the frame is configured for insertion into the outer ear of a human, a person, and/or a user of the earbud. The earbud includes, coupled to the frame, a speaker 160 configured to output sound, and an imaging system 170 configured to capture one or more images of a physical environment in which the earbud is present. In various implementations, the imaging system 170 includes one or more cameras (or image sensors). The earbud further includes, coupled to the frame, one or more processors. The speaker 160 is configured to output sound based on audio data received from the one or more processors and the imaging system 170 is configured to provide image data to the one or more processors. In various implementations, the audio data provided to the speaker 160 is based on the image data obtained from the imaging system 170.

As noted above, in various implementations an earbud includes a frame configured for insertion into an outer ear. In particular, in various implementations, the frame is sized and/or shaped for insertion into the outer ear. The frame includes a surface that rests in the intertragic notch, preventing the earbud from falling downward vertically. Further, the frame includes a surface that abuts the tragus and the anti-tragus, holding the earbud in place horizontally. As inserted, the speaker 160 of the earbud is pointed toward the ear canal and the imaging system 170 of the earbud is pointed outward and exposed to the physical environment.

Whereas the head-mounted device 150 is an example device that may perform one or more of the methods described herein, it should be appreciated that other wearable devices having one or more speakers and one or more cameras can also be used to perform the methods. The wearable audio devices may be embodied in other wired or wireless form factors, such as head-mounted devices, in-ear devices, circumaural devices, supra-aural devices, open-back devices, closed-back devices, bone conduction devices, or other audio devices.

Figure 2:
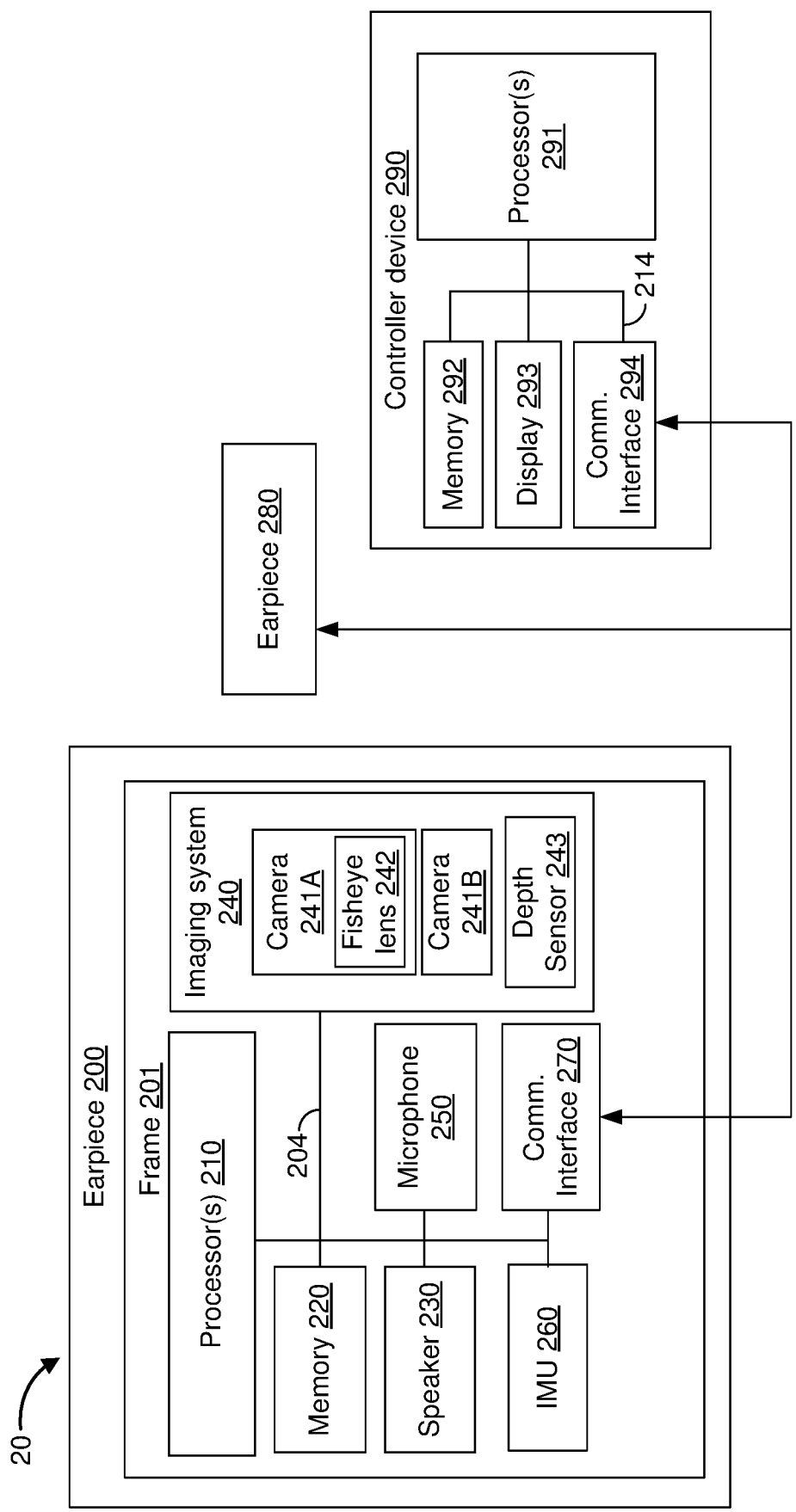
FIG. 2 is a block diagram of an example operating environment in accordance with some implementations.

FIG. 2 is a block diagram of an operating environment 20 in accordance with some implementations. The operating environment 20 includes an earpiece 200. In various implementations, the earpiece 200 corresponds to the earpiece 152 of FIG. 1. The earpiece 200 includes a frame 201. In various implementations, the frame 201 is configured for insertion into an outer ear. The earpiece 200 includes, coupled to the frame 201 and, in various implementations, within the frame 201, one or more processors 210. The earpiece 200 includes, coupled to the frame 201 and, in various implementations, within the frame 201, memory 220 (e.g., non-transitory memory) coupled to the one or more processors 210.

The earpiece 200 includes a speaker 230 coupled to the frame 201 and configured to output sound based on audio data received from the one or more processors 210. The earpiece 200 includes an imaging system 240 coupled to the frame 201 and configured to capture images of a physical environment in which the earpiece 200 is present and provide image data representative of the images to the one or more processors 210. In various implementations, the imaging system 240 includes one or more cameras 241A, 241B. In various implementations, different cameras 241A, 241B have a different field-of-view. For example, in various implementations, the imaging system 240 includes a forward-facing camera and a rearward-facing camera. In various implementations, at least one of the cameras 241A includes a fisheye lens 242, e.g., to increase a size of the field-of-view of the camera 241A. In various implementations, the imaging system 240 includes a depth sensor 243. Thus, in various implementations, the image data includes, for each of a plurality of pixels representing a location in the physical environment, a color (or grayscale) value of the location representative of the amount and/or wavelength of light detected at the location and a depth value representative of a distance from the earpiece 200 to the location.

In various implementations, the earpiece 200 includes a microphone 250 coupled to the frame 201 and configured to generate ambient sound data indicative of sound in the physical environment. In various implementations, the earpiece 200 includes an inertial measurement unit (IMU) 260 coupled to the frame 201 and configured to determine movement and/or the orientation of the earpiece 200. In various implementations, the IMU 260 includes one or more accelerometers and/or one or more gyroscopes. In various implementations, the earpiece 200 includes a communications interface 270 coupled to frame configured to transmit and receive data from other devices. In various implementations, the communications interface 270 is a wireless communications interface.

The earpiece 200 includes, within the frame 201, one or more communication buses 204 for interconnecting the various components described above and/or additional components of the earpiece 200 which may be included.

In various implementations, the operating environment 20 includes a second earpiece 280 which may include any or all of the components of the earpiece 200. In various implementations, the frame 201 of the earpiece 200 is configured for insertion in one outer ear of a user and the frame of the second earpiece 280 is configured for insertion in another outer ear of the user, e.g., by being a mirror version of the frame 201.

In various implementations, the operating environment 20 includes a controller device 290. In various implementations, the controller device 290 is a smartphone, tablet, laptop, desktop, set-top box, smart television, digital media player, or smart watch. The controller device 290 includes one or more processors 291 coupled to memory 292, a display 293, and a communications interface 294 via one or more communication buses 214. In various implementations, the controller device 290 includes additional components such as any or all of the components described above with respect to the earpiece 200.

In various implementations, the display 293 is configured to display images based on display data provided by the one or more processors 291. In contrast, in various implementations, the earpiece 200 (and, similarly, the second earpiece 280) does not include a display or, at least, does not include a display within a field-of-view of the user when inserted into the outer ear of the user.

In various implementations, the one or more processors 210 of the earpiece 200 generates the audio data provided to the speaker 230 based on the image data received from the imaging system 240. In various implementations, the one or more processors 210 of the earpiece 200 transmits the image data via the communications interface 270 to the controller device 290, the one or more processors of the controller device 290 generates the audio data based on the image data, and the earpiece 200 receives the audio data via the communications interface 270. In either set of implementations, the audio data is based on the image data.

Figure 3:
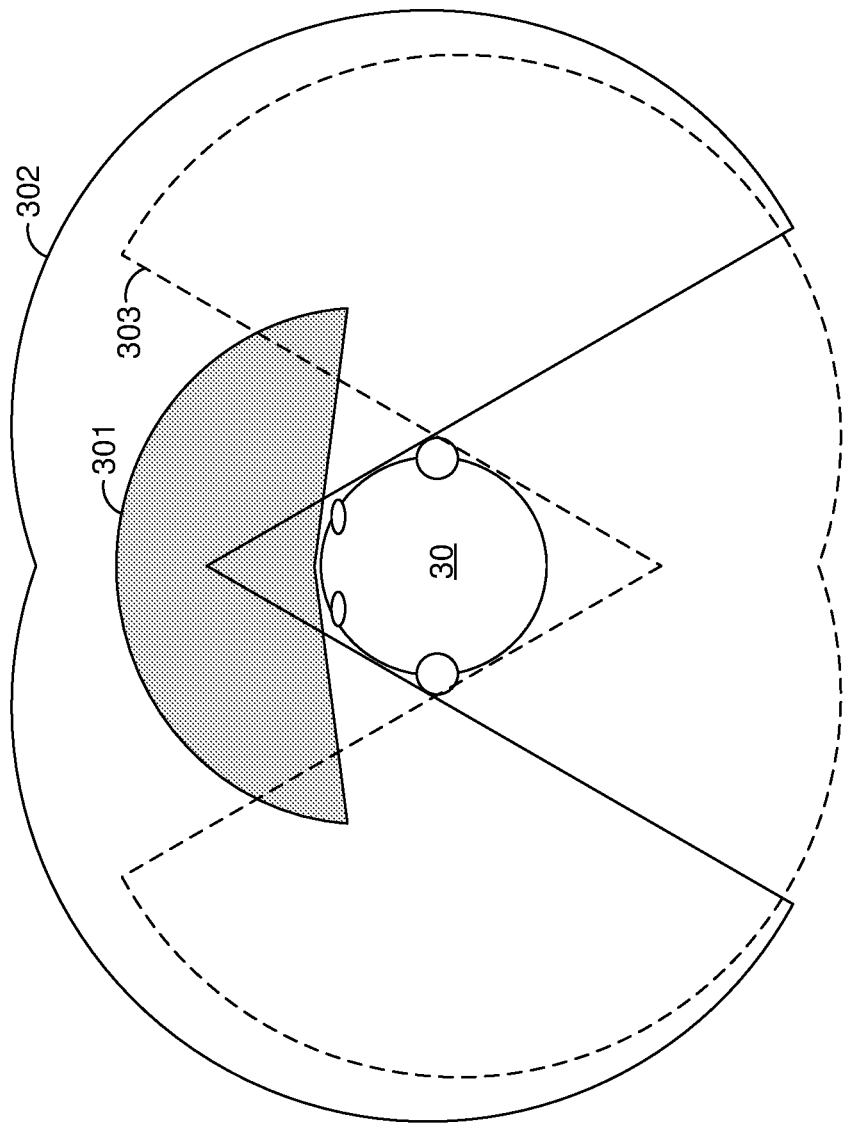
FIG. 3 illustrates various field-of-views in accordance with some implementations.

FIG. 3 illustrates various field-of-views in accordance with some implementations. A user field-of-view 301 of a user 30 typically extends approximately 300 degrees with varying degrees of visual perception within that range. For example, excluding far peripheral vision, the user field-of-view 301 is only approximately 120 degrees, and the user field-of-view 301 including only foveal vision (or central vision) is only approximately 5 degrees.

In contrast, a system (head-mounted device 150 of FIG. 1) may have a device field-of-view that includes views outside the user field-of-view 301 of the user 30. For example, a system may include a forward-and-outward-facing camera including a fisheye lens with a field-of-view of 180 degrees proximate to each ear of the user 30 and may have a device forward field-of-view 302 of approximately 300 degrees. Further, a system may further include a rearward-and-outward-facing camera including a fisheye lens with a field-of-view of 180 degrees proximate to each ear of the user 30 and may also have a device rearward field-of-view 303 of approximately 300 degrees. In various implementations, a system including multiple cameras proximate to each ear of the user can have a device field-of-view of a full 360 degrees (e.g., including the device forward field-of-view 302 and the device rearward field-of-view 303). It is to be appreciated that, in various implementations, the cameras (or combination of cameras) may have smaller or larger fields-of-view than the examples above.

The systems described above can perform a wide variety of functions. For example, in various implementations, while playing audio (e.g., music or an audiobook) via the speaker, in response to detecting a particular hand gesture (even a hand gesture performed outside a user field-of-view) in images captured by the imaging system, the system may alter playback of the audio (e.g., by pausing or changing the volume of the audio). For example, in various implementations, in response to detecting a hand gesture performed by a user proximate to the user's ear of closing an open hand into a clenched first, the system pauses the playback of audio via the speaker.

As another example, in various implementations, while playing audio via the speaker, in response to detecting a person attempting to engage the user in conversation or otherwise talk to the user (even if the person is outside the user field-of-view) in images captured by the imaging system, the system may alter playback of the audio. For example, in various implementations, in response to detecting a person behind the user attempting to talk to the user, the system reduces the volume of the audio being played via the speaker and ceases performing an active noise cancellation algorithm.

As another example, in various implementations, in response to detecting an object or event of interest in the physical environment in images captured by the imaging system, the system generates an audio notification. For example, in various implementations, in response to detecting a person in the user's periphery or outside the user field-of-view attempting to get the user's attention (e.g., by waving the person's arms), the device plays, via the speaker, an alert notification (e.g., a sound approximating a person saying "Hey!"). In various implementations, the system plays, via two or more speakers, the alert notification spatially such that the user perceives the alert notification as coming from the direction of the detected object.

As another example, in various implementations, in response to detecting an object or event of interest in the physical environment in images captured by the imaging system, the system stores, in the memory, an indication that the particular object was detected (which may be determined using images from the imaging system) in association with a location at which the object was detected (which may also be determined using images from the imaging system) and a time at which the object was detected. In response to a user query (e.g., a vocal query detected via the microphone), the system provides an audio response. For example, in response to detecting a water bottle in an office of the user, the system stores an indication that the water bottle was detected in the office and, in response to a user query at a later time of "Where is my water bottle?", the device may generate audio approximating a person saying "In your office."

As another example, in various implementations, in response to detecting an object in the physical environment approaching the user in images captured by the imaging system, the system generates an audio notification. For example, in various implementations, in response to detecting a car approaching the user at a speed exceeding a threshold, the system plays, via the speaker, an alert notification (e.g., a sound approximating the beep of a car horn). In various implementations, the system plays, via two or more speakers, the alert notification spatially such that the user perceives the alert notification as coming from the direction of the detected object.

FIG. 4 is a flowchart representation of a method 400 of playing an audio notification in accordance with some implementations. In various implementations, the method 400 is performed by a device including one or more image sensors, one or more speakers, one or more processors, and non-transitory memory (e.g., the head-mounted device 150 of FIG. 1 or the earpiece 200 of FIG. 2). In various implementations, the method 400 is performed by a device include a frame configured for insertion into an outer ear, a speaker coupled to the frame, and an image sensor coupled to the frame. In various implementations, the method 400 is performed by a device without a display or by a device including a frame that is not physically coupled to a display. In various implementations, the method 400 is performed by a device with a display. In various implementations, the method 400 is performed using an audio device (e.g., the head-mounted device 150 of FIG. 1 or the earpiece 200 of FIG. 2) in conjunction with a peripheral device (e.g., controller device 290 of FIG. 2). In various implementations, the method 400 is performed by processing logic, including hardware, firmware, software, or a combination thereof. In various implementations, the method 400 is performed by a processor executing instructions (e.g., code) stored in a non-transitory computer-readable medium (e.g., a memory).

The method 400 begins, in block 410, with the device capturing, using the image sensor, one or more images of a physical environment. In various implementations, the image sensor has a device field-of-view different than a user field-of-view, at least at a respective one or more times at which the one or more images are captured and the frame is inserted into the outer ear. In various implementations, the image sensor includes a fisheye lens. Thus, in various implementations, the device field-of-view is between approximately 120 and 180 degrees, in particular, between approximately 170 and 180 degrees.

The method 400 continues, in block 420, with the device generating audio data based on the one or more images of the physical environment. In various implementations, generating the audio data based on the one or more images of the physical environment includes transmitting, to a peripheral device, the one or more images of the environment and receiving, from the peripheral device, the audio data.

The method 400 continues, in block 430, with the device playing, via the speaker, the audio data.

Generating the audio data based on the one or more images of the physical environment (in block 420) encompasses a wide range of processing to enable various user experiences. For example, in various implementations, generating the audio data based on the one or more images of the physical environment includes detecting an object or event or interest in the physical environment and generating the audio data based on the detection. In various implementations, generating the audio data based on the detection includes creating an audio signal indicative of the detection. Thus, in various implementations, playing the audio data includes playing a new sound that would not have otherwise been played had the object or event of interest not been detected. In various implementations, playing the audio data includes playing sound when, had the object or event of interest not been detected, no sound would be played. For example, in response to detecting, e.g., using computer-vision techniques such as a model trained to detect and classify various objects, a snake as an object having an object type of "SNAKE", the device generates an audio notification emulating the sound of a person saying an object type of the object or emulating the sound of the object, e.g., a rattlesnake rattle.

In various implementations, generating the audio data based on the detection includes altering an audio stream. For example, in response to detecting a particular hand gesture, the device pauses playback of the audio stream or changes the volume of the audio stream. As another example, in response to detecting a person attempting to communicate with the user, the device ceases performing active noise cancellation upon the audio stream.

In various implementations, the device further includes a microphone configured to generate ambient sound data and generating the audio data is further based on the ambient sound data. In various implementations, the ambient sound data includes a vocal input. For example, in response to detecting, in the one or more images of the physical environment, a user performing a hand gesture indicating an object in the physical environment having a particular object type (e.g., pointing at a lamp) and detecting, in the ambient sound data, the user issuing a vocal command to translate an object type of the object (e.g., "How do you say this in Spanish?"), the device generates audio data emulating the sound of a person saying a translation of the object type of the object (e.g., "la lámpara"). As another example, in response to detecting, in the one or more images of the physical environment, a user brushing the user's teeth and detecting, in the ambient sound data, the user issuing a vocal query at a later time regarding the detection (e.g., "Did I brush my teeth this morning?"), the device generates audio data emulating the sound of a person indicating the detection (e.g., "Yes, you brushed your teeth at 6:33 today.")

As another example, in response to detecting a person attempting to communicate with the user based at least in part on the ambient sound data, the device pauses playback of an audio stream or reduces the volume of the audio stream.

In various implementations, generating the audio data is independent of the ambient sound data. For example, in response to detecting a moving object in the one or more images of the physical environment independent of the ambient sound data, the device generates an audio notification of the detection. In various implementations, the audio notification emulates the sound of a person indicating the detection of motion, e.g., "MOTION". In various implementations, the audio notification emulates the sound of the object moving in the physical environment, e.g., the rustling of leaves or breaking of branches, which may be based on an object type of the moving object.

In various implementations, the device further includes an inertial measurement unit (IMU) configured to generate pose data and generating the audio data is further based on the pose data. For example, in response to detecting that a user has fallen based on the one or more images of the environment and the pose data, the device generates an audio query ("Are you okay?"). In various implementations, the audio data is played spatially from a location based on the one or more images of the environment, e.g., stereo panning or binaural rendering. For example, in response to detecting an object in the one or more images of the environment, the device plays an audio notification spatially so as to be perceived as being produced from the location of the detected object. In various implementations, the pose data is used to spatialize the audio data.

In various implementations, in order to play the audio spatially, the method 400 is performed in conjunction with a second device comprising a second frame configured for insertion into a second outer ear and a second speaker coupled to the second frame (e.g., the earpiece 280 of FIG. 2).

As noted above, in various implementations, the image sensor has a device field-of-view different than a user field-of-view. In various implementations, the audio data is based on portions of the one or more images of the physical environment outside the user field-of-view. For example, in response to detecting a moving object (e.g., a vehicle) that is moving towards the device, otherwise referred to as an incoming object, in portions of the images of the physical environment outside the user field-of-view, the device generates an audio notification of the detection. In various implementations, the audio notification emulates the sound of a person indicating the detection of an incoming object, e.g., "INCOMING" or "LOOK OUT". In various implementations, the audio notification emulates the sound of the object moving in the physical environment, e.g., a car horn or a bicycle bell, which may be based on an object type of the incoming object.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a frame configured for insertion into an outer ear, a speaker coupled to the frame, an image sensor coupled to the frame, one or more processors, and non-transitory memory:
capturing, using the image sensor, one or more images of a physical environment;
generating audio data based on the one or more images of the physical environment, wherein the image sensor has a device field-of-view different than a user field-of-view and the audio data is based on portions of the one or more images of the physical environment outside the user field-of-view; and
playing, via the speaker, the audio data.

2. The method of claim 1, wherein generating the audio data based on the one or more images of the physical environment includes transmitting, to a peripheral device, the one or more images of the physical environment and receiving, from the peripheral device, the audio data.

3. The method of claim 1, wherein generating the audio data includes creating an audio signal.

4. The method of claim 1, wherein generating the audio data includes altering an audio stream.

5. The method of claim 1, wherein the device further includes a microphone configured to generate ambient sound data and wherein generating the audio data is further based on the ambient sound data.

6. The method of claim 5, wherein the ambient sound data includes a vocal input.

7. The method of claim 1, wherein the device further includes a microphone configured to generate ambient sound data and wherein generating the audio data is independent of the ambient sound data.

8. The method of claim 1, wherein the device further includes an inertial measurement unit (IMU) configured to generate pose data and wherein generating the audio data is further based on the pose data.

9. The method of claim 1, wherein the audio data is played spatially from a location based on the one or more images of the physical environment.

10. A device comprising:
a frame configured for insertion into an outer ear;
one or more processors coupled to the frame;
a speaker coupled to the frame and configured to output sound based on audio data received from the one or more processors; and
an image sensor coupled to the frame and configured to provide one or more images of a physical environment to the one or more processors,
wherein the one or more processors are configured to generate the audio data based on the one or more images of the physical environment, and wherein the image sensor has a device field-of-view different than a user field-of-view and the audio data is based on portions of the one or more images of the physical environment outside the user field-of-view.

11. The device of claim 10, wherein the one or more processors are configured to generate the audio data based on the one or more images of the physical environment by transmitting, to a peripheral device, the one or more images of the physical environment and receiving, from the peripheral device, the audio data.

12. The device of claim 10, further comprising a microphone configured to generate ambient sound data, wherein the one or more processors are configured to generate the audio data further based on the ambient sound data.

13. The device of claim 10, further comprising a microphone configured to generate ambient sound data, wherein the one or more processors are configured to generate the audio data independent of the ambient sound data.

14. The device of claim 10, further comprising an inertial measurement unit (IMU) configured to generate pose data, wherein the one or more processors are configured to generate the audio data further based on the pose data.

15. The device of claim 10, wherein the audio data is played spatially from a location based on the one or more images of the physical environment.

16. The device of claim 10, wherein the image sensor includes a fisheye lens.

17. The device of claim 10, wherein the frame is not physically coupled to a display.

18. A non-transitory memory storing one or more programs, which, when executed by one or more processors of a device including a frame configured for insertion into an outer ear, a speaker coupled to the frame, and an image sensor coupled to the frame cause the device to:
capture, using the image sensor, one or more images of a physical environment;
generate audio data based on the one or more images of the physical environment, wherein the image sensor has a device field-of-view different than a user field-of-view and the audio data is based on portions of the one or more images of the physical environment outside the user field-of-view; and
play, via the speaker, the audio data.

* * * * *